(12) United States Patent
Shimoyama et al.

(10) Patent No.: US 9,053,575 B2
(45) Date of Patent: Jun. 9, 2015

(54) IMAGE PROCESSING APPARATUS FOR GENERATING AN IMAGE FOR THREE-DIMENSIONAL DISPLAY

(75) Inventors: Kenichi Shimoyama, Tokyo (JP); Nao Mishima, Tokyo (JP); Takeshi Mita, Yokohama (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/234,448

(22) Filed: Sep. 16, 2011

(65) Prior Publication Data

US 2012/0069009 A1    Mar. 22, 2012

Related U.S. Application Data

(63) Continuation of application No. PCT/JP2009/066444, filed on Sep. 18, 2009.

(51) Int. Cl.
*H04N 13/02* (2006.01)
*G06T 15/20* (2011.01)

(52) U.S. Cl.
CPC ............ *G06T 15/205* (2013.01); *H04N 13/026* (2013.01)

(58) Field of Classification Search
None
See application file for complete search history.

(56) References Cited

U.S. PATENT DOCUMENTS

| 5,339,386 | A * | 8/1994 | Sodenberg et al. ........... 345/422 |
|---|---|---|---|
| 7,113,634 | B2 | 9/2006 | Yano |
| 7,403,201 | B2 | 7/2008 | Takemoto et al. |
| 2002/0015048 | A1* | 2/2002 | Nister ........................... 345/625 |
| 2002/0097241 | A1* | 7/2002 | McCormack et al. ........ 345/423 |
| 2006/0050383 | A1* | 3/2006 | Takemoto et al. ............ 359/462 |
| 2007/0258627 | A1* | 11/2007 | Geng ............................ 382/118 |
| 2008/0101685 | A1* | 5/2008 | Maeda et al. ................. 382/149 |
| 2008/0117212 | A1* | 5/2008 | Woo et al. ..................... 345/427 |
| 2008/0278487 | A1 | 11/2008 | Gobert |
| 2009/0002368 | A1* | 1/2009 | Vitikainen et al. ............ 345/422 |
| 2009/0116732 | A1* | 5/2009 | Zhou et al. .................... 382/154 |

(Continued)

FOREIGN PATENT DOCUMENTS

| CN | 1641702 | 7/2005 |
|---|---|---|
| CN | 1739303 | 2/2006 |

(Continued)

OTHER PUBLICATIONS

"3-D Transformations Overview," Aug. 2005, retrieved from http://msdn.microsoft.com/en-us/library/ms753347(v=vs.110).aspx on Apr. 23, 2014.*

(Continued)

*Primary Examiner* — Kee M Tung
*Assistant Examiner* — Ryan D McCulley
(74) *Attorney, Agent, or Firm* — Nixon & Vanderhye, P.C.

(57) ABSTRACT

A detecting unit detects an object in an input image. A depth map generating unit selects a depth template corresponding to a type of the object and places a selected depth template on a depth map in accordance with a position of the object to generate the depth map having a depth value for each pixel. A correcting unit calculates a weight of at least one interested pixel and a weight of a peripheral pixel based on a relationship between pixel values to the interested pixel and the peripheral pixel and corrects the depth value of the interested pixel based on a weighted sum of the respective depth values corresponding to the interested pixel and the peripheral pixel. An image generating unit generates parallax images based on the corrected depth map and the input image.

7 Claims, 9 Drawing Sheets

(56) References Cited

U.S. PATENT DOCUMENTS

| | | | |
|---|---|---|---|
| 2010/0046050 A1* | 2/2010 | Kroll et al. | 359/9 |
| 2010/0141757 A1* | 6/2010 | Baik et al. | 348/135 |
| 2010/0231689 A1* | 9/2010 | Bruls et al. | 348/43 |
| 2011/0025827 A1* | 2/2011 | Shpunt et al. | 348/47 |
| 2011/0273529 A1* | 11/2011 | Lai et al. | 348/42 |

FOREIGN PATENT DOCUMENTS

| | | |
|---|---|---|
| CN | 101398933 | 4/2009 |
| JP | 2003-47027 | 2/2003 |
| JP | 2008-535116 | 8/2008 |
| WO | WO 2004/071102 | 8/2004 |

OTHER PUBLICATIONS

English-language translation of International Preliminary Report on Patentability for PCT/JP2009/066444.

International Search Report for PCT/JP2009/066444, mailed Oct. 20, 2009.

Office Action mailed Jul. 17, 2013 in counterpart Chinese Patent Application No. 200980159320.9 and English-language translation thereof.

Office Action dated Mar. 14, 2014 in counterpart Chinese Application No. 200980159320.9 and English-language translation thereof.

Office Action issued Jul. 1, 2014 in counterpart Chinese Application No. 200980159320.9 and English translation thereof.

\* cited by examiner

IMAGE PROCESSING APPARATUS FOR GENERATING AN IMAGE FOR THREE-DIMENSIONAL DISPLAY

CROSS REFERENCE TO RELATED APPLICATIONS

This application is a continuation of International Application No. PCT/JP2009/066444, filed on Sep. 18, 2009, the entire contents of which is hereby incorporated by reference.

FIELD

Embodiments of the present invention relate to an image processing apparatus that generates from a two-dimensional image an image for three-dimensional display.

BACKGROUND

In a method for generating three-dimensional images disclosed in JP-A 2008-504887, first, in a two-dimensional image including a mobile object, the mobile object is detected and tracked. Then, a standard template is set to a detected position and correction is performed using lines having a size and contrast of the detected object to divide the image into a foreground part including the detected object and a background part. Depth models are given to the foreground and the background, and thereby a three-dimensional image is generated.

However, in the method disclosed in JP-A 2008-504887, because a two-dimensional image is segmented using line information such as edges in the image, there is a problem that only the periphery of an object matches actual three-dimensional information. Moreover, the scheme in which a depth model is given after segmentation poses a problem that when a three-dimensional image is produced, the image quality may significantly deteriorate because the given depth model does not necessarily match three-dimensional information.

DETAILED DESCRIPTION

Figure 1:
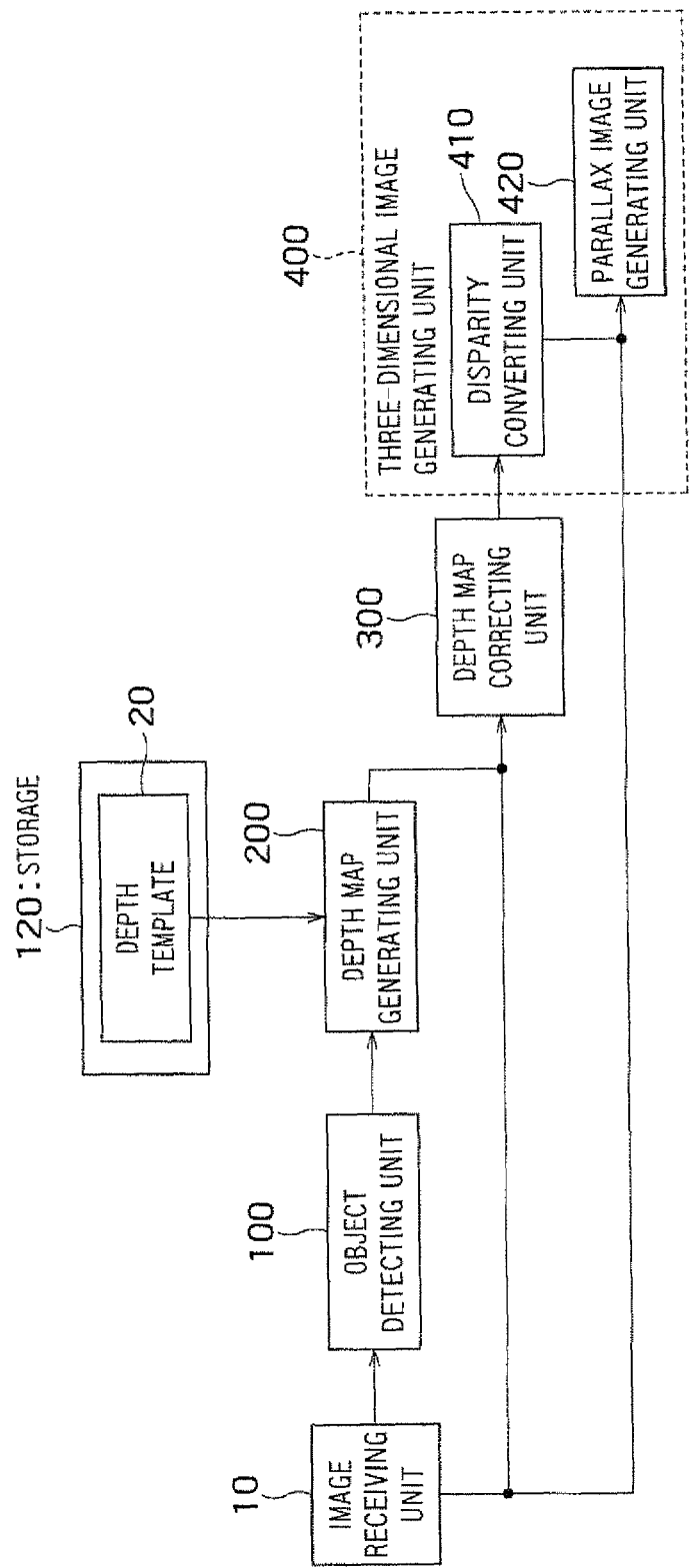
FIG. 1 illustrates a configuration example of an image processing apparatus according to a first embodiment.

There is provided an image processing apparatus including: a detecting unit, a depth map generating unit, a correcting unit and an image generating unit.

The detecting unit detects an object in an input image including pixel values of each pixel.

The depth map generating unit selects, from at least one depth template defining a depth value of a pixel, a depth template corresponding to a type of the object and place a selected depth template on a depth map in accordance with a position of the object to generate the depth map having a depth value for each pixel of the input image.

The correcting unit calculates a weight of at least one interested pixel and a weight of a peripheral pixel in the depth map based on a relationship between respective pixel values corresponding to the interested pixel and the peripheral pixel and corrects the depth value of the interested pixel based on a weighted sum of respective depth values of the interested pixel and the peripheral pixel.

The image generating unit generates a plurality of parallax images based on the depth map corrected by the correcting unit and the input image.

Now, embodiments of the present invention will be described with reference to the drawings. It should be noted that components and processes that function in the same manner are denoted by the same reference numerals, and a redundant description thereof is omitted.

First Embodiment

FIG. 1 illustrates a configuration example of an image processing apparatus according to the present embodiment.

An image receiving unit 10 receives a two-dimensional image to be processed. The received two-dimensional image includes pixel values of a plurality of pixels. The image receiving unit 10 can receive input images from any device or medium. For example, the image receiving unit 10 may receive image data from a recording medium such as HDD and from an external apparatus connected with the image receiving unit 10 via a network.

An object detecting unit 100 analyzes the input image to detect an object included in the input image and a position of the object.

A depth template storage 120 stores for each object type a depth template 20 in which a depth value of each pixel of a corresponding object is held.

A depth map generating unit 200 reads out from the storage 120 the depth template 20 associated with the object detected by the object detecting unit 100 and places the depth template 20 on an initial map in accordance with the detected position of the object, thereby generating the depth map in which a depth value corresponding to each pixel of the input image is held.

A depth map correcting unit (correcting unit) 300 sequentially selects each pixel on the depth map as an interested pixel, and performs weighted smoothing on the interested pixels and their peripheral pixels, thereby correcting the depth values of the interested pixels. Weights of the interested pixels and the peripheral pixels are calculated based on differences between pixel values of pixels in the input image corresponding to the interested pixels and pixel values of the pixels in the input image corresponding to the peripheral pixels.

A three-dimensional image generating unit 400 generates a plurality of parallax images (an image for right eye and an image for left eye) from the input image and the corrected depth map. The generated parallax images are used to display a three-dimensional image. For example, a plurality of parallax images are displayed in turn in a time-division manner to allow a viewer to recognize a three-dimensional image. The viewer wears specialized eyeglasses such as liquid crystal glasses and right and left liquid crystal shutters are switched in accordance with display of each parallax image. This allows the right and the left eyes to receive images for right eye and images for left eye in turn, and thereby the viewer can recognize a three-dimensional image. Now, the object detecting unit 100, the depth template 20, the depth map generating unit 200, the depth map correcting unit 330, and the three-dimensional image generating unit 400 will be described in detail. The following description assumes the items (1) to (4).

(1) Let the origin be an upper left-hand corner of an input image, an x axis is set in a horizontal direction, and a y axis is set in a vertical direction. Note that, a way to set coordinates is not limited thereto. In addition, a pixel value of coordinates (x,y) in an input image is represented as "P (x,y)." The pixel value means any value that represents brightness or color components of an image, and corresponds to luminance, brightness, and a certain color channel, for example.

(2) In a depth map, let the origin be an upper left-hand corner of the map, an X axis is set in a horizontal direction, and a Y axis is set in a vertical direction. Note that, a way to set coordinates is not limited thereto. In addition, a pixel value at coordinates (X,Y) on the map is represented as "Z (X,Y)." At this time, the pixel value represents depth information, and a higher value represents a greater depth.

(3) Coordinates of an input image correspond to the same coordinates of a map on a one-to-one basis. Unless otherwise described, it is assumed that the size of an input image is equal to the size of a map and coordinates (x,y) of an input image correspond to the same coordinates (X,Y) of a map.

(4) Unless otherwise described, a pixel value of an input image is described as the "pixel value" and a pixel value range is [0,255] (0 or more and 255 or less). In addition, a pixel value of a depth map is described as the "depth value" and a depth value range is [0,255] (0 or more and 255 or less).

First, the object detecting unit 100 will be described.

The object detecting unit 100 detects an entire object or a part thereof and a position of the object to be detected from the input image. Any number of types of objects may be detected, and any number of objects may be included in an image. For example, an entire person, a part of a person (a face, a hand, and a foot), a vehicle, and a plant may be detected, and different orientations of a person's face may also be assigned to different types of an object. Hereinafter, a position on an input image of an i-th object detected at coordinates (x,y) on the input image will be represented as "Ai (x,y)."

A method of detecting an object may be a commonly-known method. Also, various methods may be combined with each other depending upon an object to be detected. For example, if an object to be detected is a person, a method that uses a face detecting technique for detecting a face, which is a part of a person, is conceived. For example, a method described in Reference 1 (MITA Takeshi, KANEKO Toshimitsu, HORI Osamu, "Joint Haar-like Features Based on Feature Co-occurrence for Face Detection," IEICE TRANSACTIONS, D-II Vol. J89-D-II No. 8 pp. 1791-1801, 2006) can be used. In the method, a face is detected using Haar-like features in an image, and specifically, a position and a size of a rectangle placed so as to enclose a face can be determined. That is, a position and a size of the face can be seen. In addition, by changing dictionaries used for detection, an orientation of the face can also be detected.

Next, the depth template 20 will be described.

Figure 5:
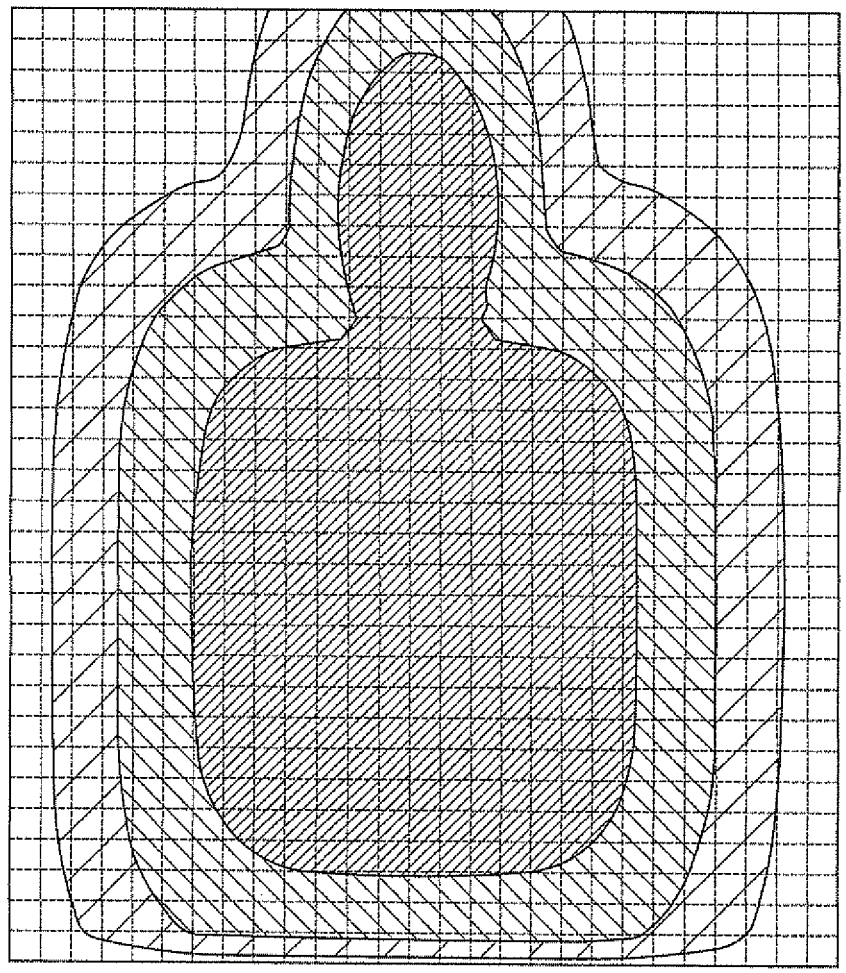
FIG. 5 illustrates an example of a depth template.

The depth template 20 is prepared for each object type. The depth template represents a schematic shape of an actual three-dimensional shape of an object. Specifically, the depth template represents a depth of an object on a two-dimensional image as pixel values, the object being viewed from an angle at which the object is to be detected. For example, if an object to be detected is an upper part of a person, the depth template is a depth template shown in FIG. 5. In FIG. 5, the smaller a depth value is (the blacker), the smaller the depth is, and the greater a depth value is (the whiter), the greater the depth is.

Figure 6:
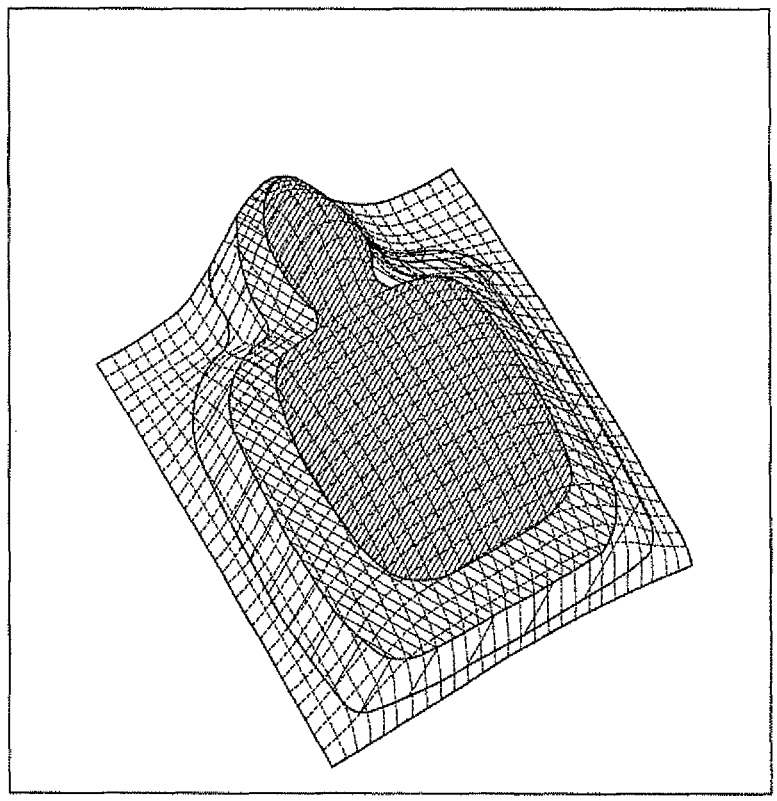
FIG. 6 illustrates the depth template in FIG. 5 that is displayed in 3D.

FIG. 6 shows FIG. 5 in 3D (dimension). The depth template includes such three-dimensional information. One or more such depth templates are prepared for each object type to be detected and stored in the storage 120.

Next, the depth map generating unit 200 will be described.

The depth map generating unit 200 places a depth template associated with a detected object on a position "Bi (X,Y)" on the map corresponding to a position "Ai (x,y)" of the object detected by the object detecting unit 100. Thereby a depth map is generated.

Figure 7:
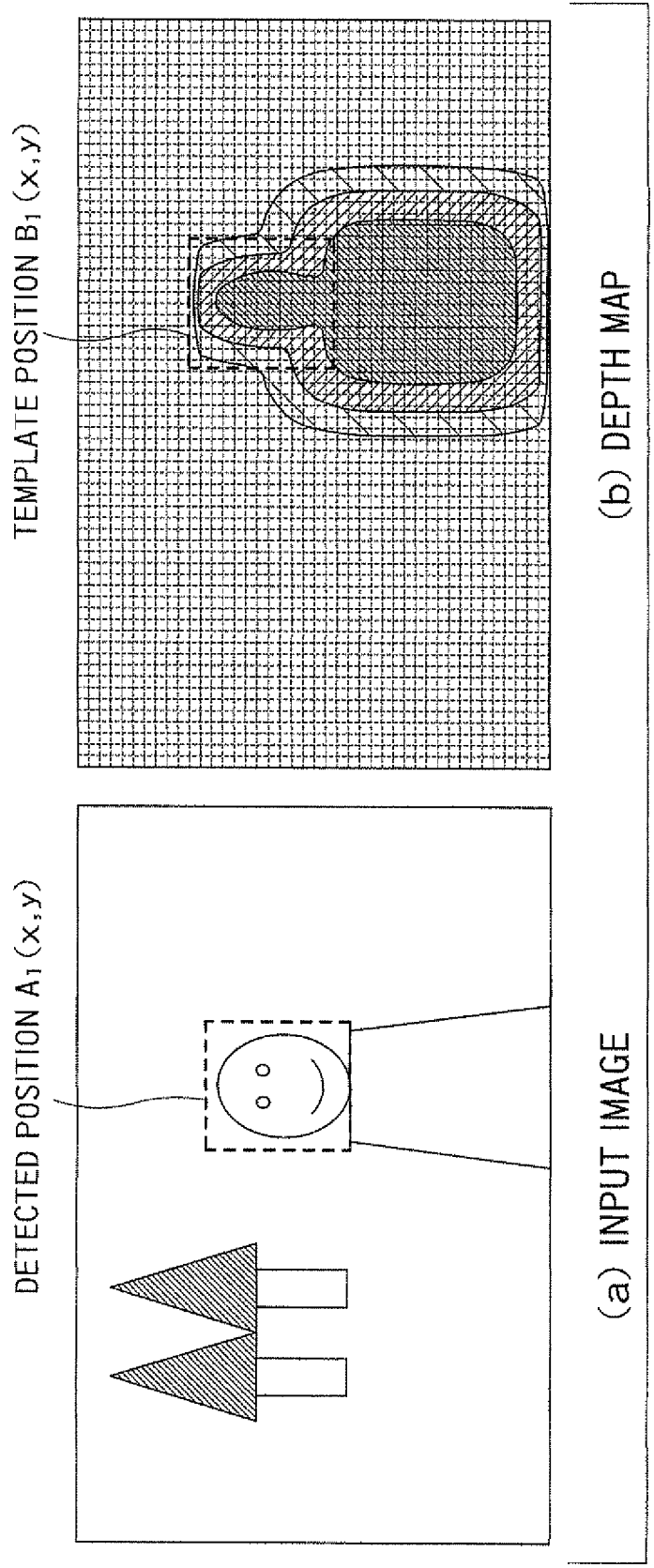
FIG. 7 illustrates an example in which a depth template is placed on a map.

FIGS. 7(*a*) and 7(*b*) are an example in which a person is detected from an input image and a depth template is placed on a map (initial map). A face of the person is detected by the object detecting unit 100 from the input image in FIG. 7(*a*), and an upper left-hand corner of the face is coordinates "A1 (x,y)." At this time, as illustrated in FIG. 7(*b*), a corresponding depth template is placed so that the upper left-hand corner coincides with the position "B1 (X,Y)" on the depth map corresponding to the upper left-hand corner of the person's face.

Now, depth templates may overlap each other on the depth map due to detection of a plurality of objects. Various methods are conceived to determine a depth value at coordinates of a plurality of overlapping depth templates. For example, the following methods (1) to (5) are conceived.

(1) An average is used. That is, an average of depth values at the coordinates of the depth templates, at which the depth templates overlap each other, is used.

(2) A minimum value is used. That is, a minimum value of depth values at the coordinates of the depth templates, at which the depth templates overlap each other, is used.

(3) A weighted average is used. A weighted average of depth values at the coordinates of the depth templates, at which the depth templates overlap each other, is used. For example, a template with the lower depth value is strongly weighted.

(4) A median value is used. That is, a median value of depth values at the coordinates of the depth templates, at which the depth templates overlap each other, is used.

(5) Object types are prioritized and a depth value of a template corresponding to a highest-priority object is used. If there are a plurality of objects having the same priority, the methods (1) to (4) are applied to these objects.

It is now assumed that an initial value (reference value) is set to each of coordinates of an initial map. As a reference value, for example, the deepest reference value 255 (deepest) may be set. When a depth template is placed, the reference value is updated (overwritten) by a depth value of the template. Alternatively, the depth value may be updated according to the methods (1) to (5).

Next, the depth map correcting unit 300 will be described.

The depth map correcting unit 300 performs weighted smoothing on the interested pixel "D (X,Y)" on the depth map and its peripheral pixels, thereby correcting the depth map. The peripheral pixels are pixels within a range close to the interested pixel. For example, the peripheral pixels refer to pixels located within a certain fixed distance from the interested pixel.

A weight used for correction is set in accordance with a relationship between pixel values of a corresponding interested pixel "C (x,y)" in an input image corresponding to an interested pixel "D (X,Y)" and its peripheral pixels (corresponding peripheral pixels). A weight is basically set based on a difference between the pixel value of the corresponding interested pixel "C (x,y)" and the pixel values of the corresponding peripheral pixels. For example, as the difference becomes smaller, the weight may be set to be higher, and as the difference becomes larger, the weight may be set to be lower.

For such correction of a depth map, for example, a bilateral filter may be used. In depth map correction that uses a bilateral filter, assuming that a corrected depth value is "Z' (X,Y)," the value can be expressed by expression 1. In expression 1, "k" is a window size of a filter.

Expression 1: depth map correction using a bilateral filter $$Z'(X, Y) = \frac{\sum_{n=-k}^{k} \sum_{m=-k}^{k} Z(X+m, Y+n) * W(x, y, m, n)}{\sum_{n=-k}^{k} \sum_{m=-k}^{k} W(x, y, m, n)}$$

$$W(x, y, m, n) = W_1(m, n) * W_2(P(x, y), P(x+m, y+n))$$

For example, in expression 1, if a Gaussian distribution is used for "$W_1$" and "$W_2$," the following expression is obtained.

$$W_1(m, n) = \frac{1}{\sqrt{2\pi}\sigma_1} \exp\left\{-\frac{m^2 + n^2}{2\sigma_1^2}\right\}$$

$$W_2(P(x, y), P(x+m, y+n)) = \frac{1}{\sqrt{2\pi}\sigma_2} \exp\left\{-\frac{(P(x, y) - P(x+m, y+n))^2}{2\sigma_2^2}\right\}$$

where, "σ1" and "σ2" are standard deviations of the Gaussian distribution. "$W_1$" evaluates a spatial distance between a corresponding interested pixel and corresponding peripheral pixels. "$W_2$" evaluates a distance between a pixel value of a corresponding interested pixel and pixel values of corresponding peripheral pixels, and as a difference between the values becomes smaller, brightness levels of the values become closer to each other. It will be understood from Expression 1 that as a difference between spatial distances becomes smaller, a weight becomes heavier and as a distance between pixel values becomes smaller, a weight becomes heavier. It is noted that "m=0,n=0" means an interested pixel itself. In this case, it is needless to say that a difference between "P (x,y)" and "P (x+m,y+n)" is 0. "Z' (X,Y)" in expression 1 calculates a weighted average of depth values of each peripheral pixel and an interested pixel.

Also, an ε filter may be used for the depth map correction. The depth map correction that uses an ε filter can be expressed by expression 2. A value of an ε filter is selected on the basis of an input image and filtering is performed on a depth map.

Expression 2: depth map correction using an ε filter $$Z'(X, Y) = \frac{\sum_{n=-k}^{k} \sum_{m=-k}^{k} Z(X, Y) * W(x, y, m, n) + Z(X+m, Y+n) * (1 - W(x, y, m, n))}{\sum_{n=-k}^{k} \sum_{m=-k}^{k} \{W(x, y, m, n) + (1 - W(x, y, m, n))\}}$$

$$W(x, y, m, n) = W_1(m, n) * W_2(P(x, y), P(x+m, y+n))$$

The "$W_1$" and "$W_2$" may be set as follows:

$$W_1(m, n) = 1$$

$$W_2(P(x, y), P(x+m, y+n)) = \begin{cases} 0: & P(x, y) - P(x+m, y+n) \leq \varepsilon \\ 1: & P(x, y) - P(x+m, y+n) > \varepsilon \end{cases}$$

In these expressions, "k" is a window size of the filter and "ε" is a threshold value of the ε filter. If a difference between a pixel value "P (x,y)" of a corresponding interested pixel "C (x,y)" and a pixel value "P (x+m,y+n)" of a corresponding peripheral pixel "C (x+m,y+n)" is greater than the threshold value, "$W_2$" takes on a value of 1, and if the difference is equal to or smaller than the threshold value, "$W_2$" takes on a value of 0. Therefore, if the difference is equal to or smaller than the threshold value, a weight of a peripheral pixel becomes heavy, and if the difference is greater than the threshold value, a weight of a peripheral pixel becomes 0 as well as a weight of an interested pixel becomes heavy. Note that "m=0,n=0" means an interested pixel itself. In accordance with the weights set in such a manner, weighted averages of depth values of peripheral pixels and interested pixels are calculated. Specifically, an average of a depth value selected for each peripheral pixel and a depth value of an interested pixel is calculated. Here, "$W_1$" is always 1, but a Gaussian distribution or the like may also be used for "$W_1$."

Also, a median value filter may be used for the correction of a depth map. In the filtering, a median value is found in a corresponding interested pixel and corresponding peripheral pixels and if a pixel value matches the median value, a pixel on a depth map corresponding to a pixel of the pixel value is selected. A median value is found within a range of a filter window. In the median value filter, weights "$W_1$" and "$W_2$" in expression 1 may be set in a manner of the following expression 3.

Expression 3: if a median value filter is used $$W_1(m, n) = 1$$

$$W_2(P(x, y), P(x+m, y+n)) = \begin{cases} 1: & \text{if } P(x+m, y+n) \text{ is a median value} \\ 0: & \text{if } P(x+m, y+n) \text{ is not a median value} \end{cases}$$

If a pixel value "P (x+m,y+n)" of a corresponding peripheral pixel "C (x+m,y+n)" matches a median value, "$W_2$" takes a value of 1, and if the value "P (x+m,y+n)" does not match the median value, "$W_2$" takes a value of 0. The purpose is to, if there are a plurality of median values, take an average of the median values. Also, instead of 0 or 1, the weight of "$W_2$" may be heavier as a pixel (a corresponding interested pixel or a corresponding peripheral pixel) has the smaller difference between a median value and a pixel value, and a weighted median value filter may be set.

Next, the three-dimensional image generating unit 400 will be described.

The three-dimensional image generating unit 400 converts the corrected depth map into a disparity map in a disparity (parallax) converting unit 410 and generates in a parallax image generating unit 420 parallax images from the disparity map and the input image.

First, the disparity converting unit 410 will be described.

The disparity converting unit 410 determines a parallax vector (disparity value) of each pixel from a depth value "z" of each pixel on the depth map and generates a disparity map on which a parallax vector of each pixel is described. The parallax vector shows how much an input image moves to generate parallax images. In this manner, the disparity converting unit 410 converts a depth map into a disparity map.

Now, a method of determining a parallax vector "d" from a depth value "z" will be described below.

Figure 8:
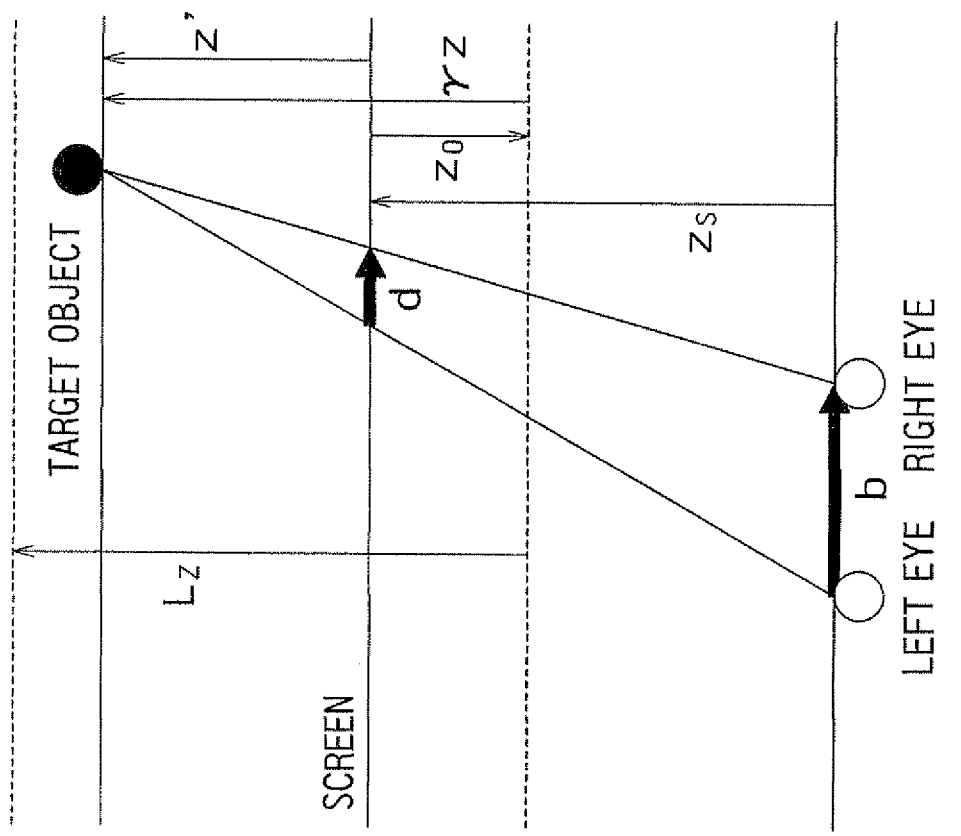
FIG. 8 illustrates a method for calculating a parallax vector.

As shown in FIG. 8, the parallax vector "d" is calculated by using similitude between triangles, one of which is formed by lines with which a right eye, a left eye, and a target object are connected and the other of which is formed by parallaxes (a right parallax and a left parallax) on a screen and the target object. Here, the following parameters "z," "d," "b," "$z_s$," "$z_0$," and "$L_z$" will be defined.

Depth: z

Parallax vector: d [cm]

Distance between eyes: b [cm]

Distance to screen; $z_s$ [cm]

Jumping out distance: $z_0$ [cm]

Depth size in real space: $L_z$ [cm]

The parameters "b," "$z_s$," "$z_0$," and "$L_z$" are preset to any value.

The depth value "z" is within the range of 0 to 255 as described above, and a value of 0 means a nearest position and a value of 255 means a farthest position (in FIG. 8, a lower horizontal dotted line corresponds to 0 and an upper horizontal dotted line corresponds to 255). Note that these values are imaginary only and different from actual distances.

Thus, if a depth size in a real space "$L_z$" is used to calculate a distance in the real space per depth unit, the distance can be expressed as follows. "$Z_{max}$" is a maximum value of the depth values and here, "$Z_{max}$" is 255.

Converting depth into real space:

$$\gamma = \frac{L_z}{z_{max}} \ [cm]$$

Therefore, a distance from a screen to a target object can be expressed as follows.

$$z' = \gamma z - z_0$$

The parameters "b," "$z_s$," "$z_0$," and "$L_z$" of stereoscopic vision may be determined based on stereoscopic vision to be presented. For example, "$z_s$" (a distance to a screen) is determined in accordance with a position of an actual screen, and in order to increase a jumping out amount from a screen, "$z_0$" (a jumping out distance) is increased. In addition, a depth in the real space can be determined by "$L_z$."

If the parameters of the stereoscopic vision are determined, similitude between the above-described two triangles can be used to calculate the parallax vector "d" from the depth value "z" by the following expression (a depth parallax vector conversion model).

Expression 4: a depth parallax vector conversion model $$d : b = (z') : (z_s + z')$$

$$d = b \left( \frac{z'}{z_s + z'} \right); \text{ The unit is } [cm].$$

Since the unit of "d" is distance in the real space (cm), the unit is needed to be converted into pixel. This is expressed by the following expression.

$$d_{pixel} = \frac{\text{screen resolution [pixel]}}{\text{screen size [cm]}} \times d$$

In this way, the disparity converting unit 410 determines a parallax vector from the depth value "z" for each pixel on the depth map and generates a disparity map in which a parallax vector for each pixel is described.

Next, the parallax image generating unit 420 will be described.

The parallax image generating unit 420 generates a desired number of parallax images from the input image and the disparity map.

Figure 9:
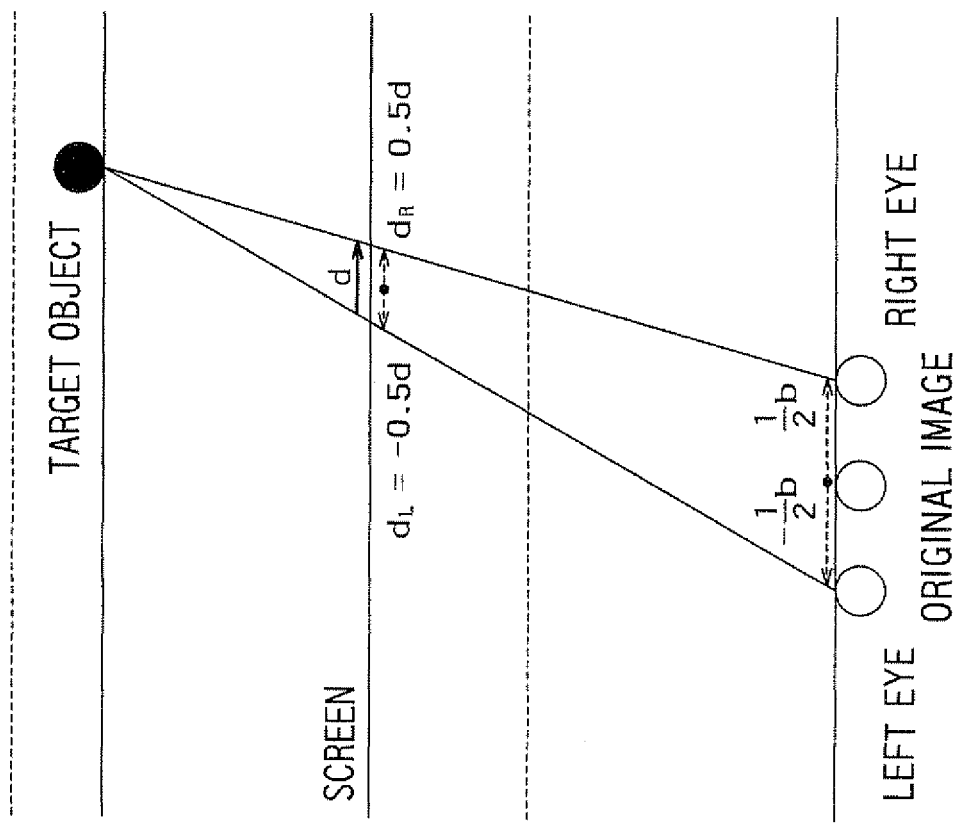
FIG. 9 illustrates a left parallax vector and a right parallax vector divided from the parallax vector.

For example, as shown in FIG. 9, assuming that the input image is received from a point of view at the middle between a left eye and a right eye, a left parallax image and a right parallax image can be generated from the following left and right parallax vectors obtained by dividing the parallax vector "$d_{pixel}$" into −½ and ½.

Expression 5: right and left parallax vectors $$d_L = -\frac{1}{2}d$$

$$d_R = \frac{1}{2}d$$

More specifically, the left parallax image can be generated by moving the pixel value "P (x,y)" of the input image in accordance with "$d_L$." The right parallax image can be generated by moving the pixel value "P (x,y)" of the input image in accordance with "$d_R$." Because only simple moving may cause a blank space, the image may be interpolated by an area obtained using a parallax vector around the blank space. The case in which there are two parallaxes has been described as an example, but a similar procedure may be followed also when there are multi parallaxes.

Thus, according to the present embodiment, a depth template according to an object detected from an input image is placed to generate a depth map, and a depth value of an interested pixel on the depth map is corrected on the basis of a weight with respect to peripheral pixels, the weight being determined based on a distance between pixel values of a corresponding interested pixel and corresponding peripheral pixels in the input image. Thereby, a depth map adapted to actual three-dimensional information of an input image can be obtained with high contrast (for example, without an edge blurring), and therefore parallax images that enable a viewer to visually identify a high-quality three-dimensional image can be generated.

Second Embodiment

Figure 2:
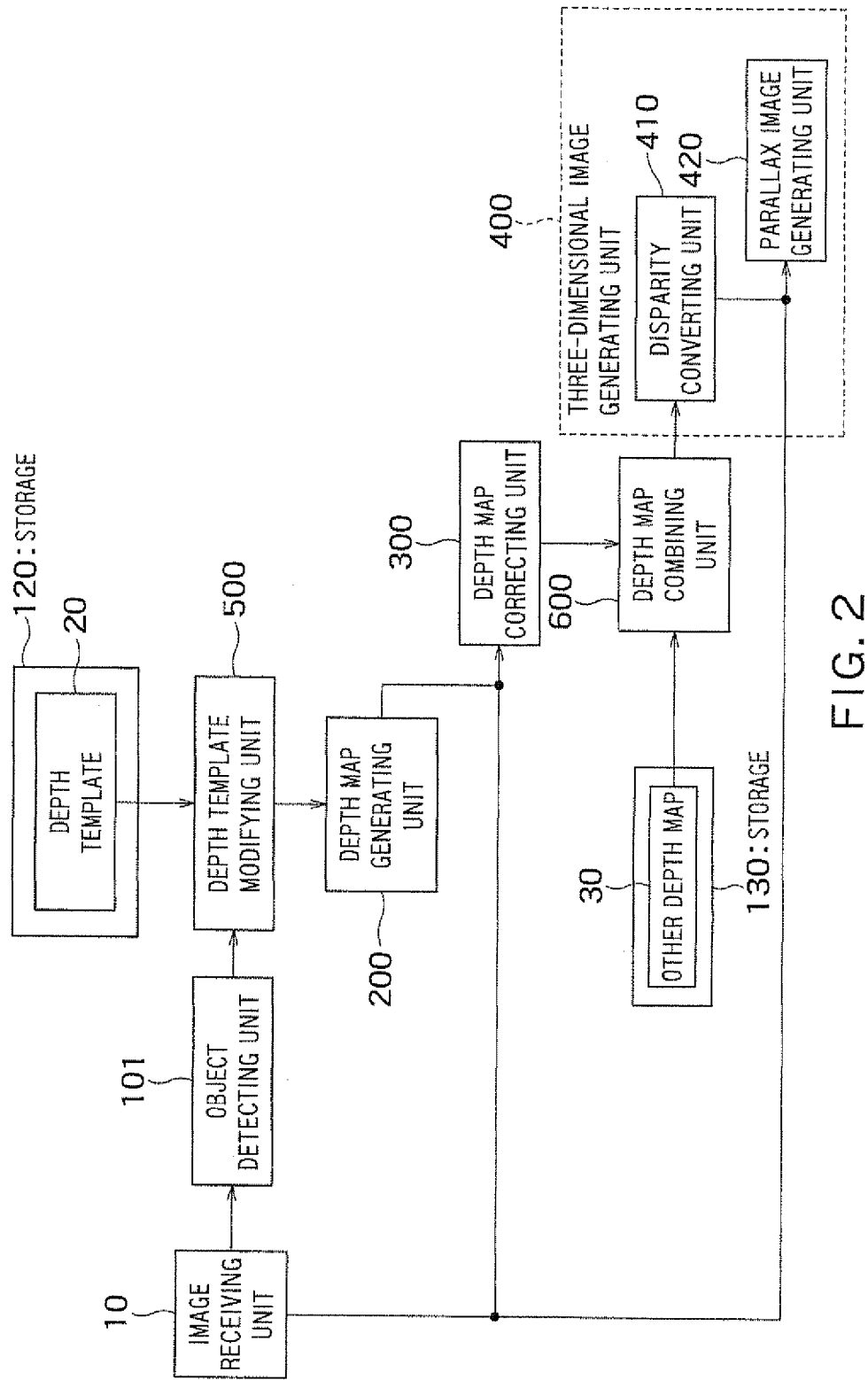
FIG. 2 illustrates a configuration example of an image processing apparatus according to a second embodiment.

FIG. 2 illustrates a configuration example of an image processing apparatus according to the present embodiment. An image receiving unit 10 receives a two-dimensional image to be processed.

An object detecting unit 101 detects an object included in the input image and a type, a position, a size, and an orientation of the object.

A storage 120 stores for each object type a depth template 20 in which a depth value of each pixel of a corresponding object is held.

A depth template modifying unit 500 reads out from the storage 120 a depth template corresponding to a type of the object detected by the object detecting unit 101, and modifies the depth template based on the size and the orientation of the object.

A depth map generating unit 200 generates a depth map by placing on a map the depth template modified by the depth template modifying unit 500, on the basis of the position of the object detected by the object detecting unit 100.

A depth map correcting unit 300 selects each pixel on the depth map as an interested pixel and performs weighted smoothing on the interested pixel and its peripheral pixels to correct a depth value of the interested pixel, thereby correcting the depth map. A correcting method may be the same method used in the first embodiment.

A storage 130 stores another depth map 30 that is given by some kind of means and is a depth map corresponding to the input image.

A depth map combining unit 600 reads out from the storage 130 the other depth map 30 and combines the other depth map 30 and the depth map corrected by the depth map correcting unit 300.

A three-dimensional image generating unit 400 generates parallax images from the depth map combined by the depth map combining unit 600 and the input image.

Now, the object detecting unit 101, the depth template modifying unit 500, the other depth map information 30, and the depth map combining unit 600 will be described in more detail.

The object detecting unit 101 will be described.

The object detecting unit 101 detects from the input image a position, a size, and an orientation of an entire or a part of an object to be detected. Also, the object detecting unit 101 detects a type of the object. The object detecting unit 101 operates in the same manner as the object detecting unit 100 in the first embodiment except that a size and an orientation are detected.

The depth template modifying unit 500 will be described,

The depth template modifying unit 500 modifies the depth template read out from the storage 120, based on the size and the orientation of the detected object. If all templates according to the size and orientation of the object are prepared, an amount of the templates is enormous, Therefore, a prepared depth template is modified in accordance with detected information of an object.

If a detected size of an object is different from a size of a prepared depth template, the size of the depth template may be scaled to the object size. The scaling may be performed by a generally-known method. In addition, if a detected orientation of an object is different from an orientation of a prepared depth template, the orientation of the depth template may be changed. The changing of an orientation may be performed by a generally-known morphing technique or the like.

The other depth map 30 will be described.

The other depth map 30 is a depth map that is given by other means and relates to an input image. The other depth map 30 may be, for example, another depth map in which background composition depths from entire composition are held. Furthermore, in processing for a moving image or the like, a depth map used for an image t frames before may be used as the other depth map.

The depth map combining unit 600 will be described.

The depth map combining unit 600 combines the depth map corrected by the depth map correcting unit 300 and the other depth map 30. Any number of types of other depth maps may be combined.

Various combining methods are conceived; basically, pixels corresponding to each other between depth maps may be combined. For example, the following methods for combining pixels may be conceived.

(1) A depth value average of pixels is used.
(2) A maximum value of depth values of pixels is used.
(3) A minimum value of depth values of pixels is used.
(4) A depth value weighted average of pixels is used.
For example, the weight becomes heavier as the depth becomes smaller.
(5) A median value of depth values of pixels is used.

Thus, according to the second embodiment, even if a depth map obtained by placing a depth template is combined with another depth map, a depth map with high contrast can be obtained, and thereby parallax images that enable a viewer to visually identify a high-quality three-dimensional image can be generated.

Third Embodiment

Figure 3:
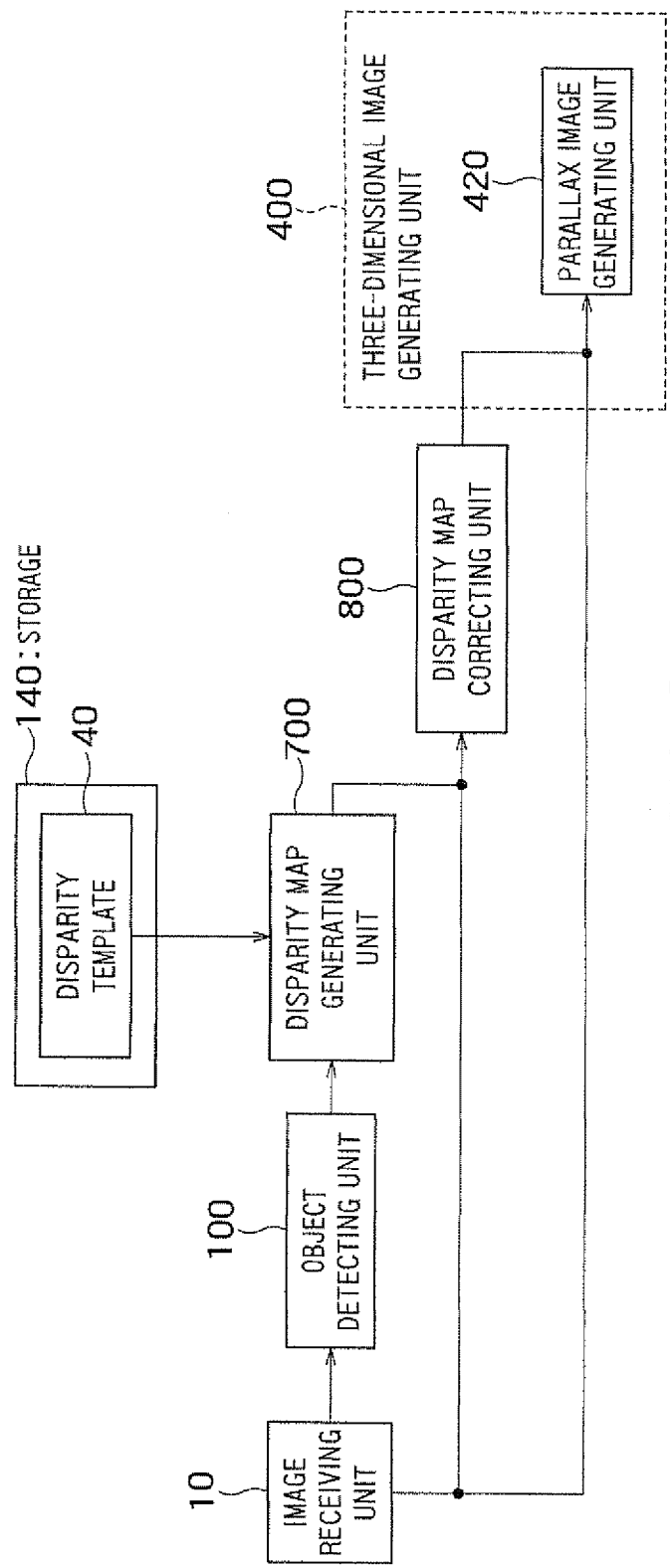
FIG. 3 illustrates a configuration example of an image processing apparatus according to a third embodiment.

FIG. 3 illustrates a configuration example of an image processing apparatus according to the present embodiment.

An image receiving unit 10 receives a two-dimensional image to be processed.

An object detecting unit 100 detects an object, and a type and a position of the object from the input image.

A storage 140 stores for each object type a disparity template 40 in which a disparity value (parallax value) of each pixel of a corresponding object is held.

A disparity map generating unit 700 reads out from the storage 140 the disparity template 40 corresponding to a type of the object detected by the object detecting unit 100 and places the disparity template 40 on a map on the basis of a detected position of the object, thereby generating a disparity map.

A disparity map correcting unit (correcting unit) 800 selects each pixel on the disparity map as an interested pixel, and performs weighted smoothing on the interested pixels and their peripheral pixels to correct the disparity values of the interested pixels, thereby correcting the disparity map. At this time, weights of the interested pixels and the peripheral pixels are calculated based on differences between pixel values of pixels in the input image corresponding to the interested pixels and pixel values of the pixels in the input image corresponding to the peripheral pixels.

The three-dimensional image generating unit 400 generates parallax images from the input image and the corrected disparity map.

Now, the disparity template 40, the disparity map generating unit 700, the disparity map correcting unit 800, and the three-dimensional image generating unit 400 will be described in more detail.

In the following description, in a disparity map, let the origin be an upper left-hand corner of the map, an X axis is set in a horizontal direction, and a Y axis is set in a vertical direction. A way to set coordinates is not limited thereto. In addition, a pixel value (disparity value) at coordinates (X,Y) on the disparity map is represented as "d (X,Y)." Coordinates of an input image correspond to the same coordinates of the disparity map on a one-to-one basis. Unless otherwise described, it is assumed that a size of an input image is equal to a size of the map and coordinates (x,y) of the input image correspond to the same coordinates (X,Y) of the map.

The disparity template 40 will be described.

The disparity template 40 is prepared for each object type and has a disparity (parallax) value of a corresponding object type. The disparity template 40 can be acquired by converting the depth template 20 in the same processing as the disparity converting unit 410 in FIG. 1.

The disparity map generating unit 700 will be described.

The disparity map generating unit 700 places, in the same manner as the depth map generating unit 200 in FIG. 1, a disparity template associated with a type of the detected object, on a position "Bi(X,Y)" on the disparity map corresponding to a position "Ai(x,y)" of the object detected by the object detecting unit 101, thereby generating a disparity map.

The disparity map correcting unit 800 will be described.

The disparity map correcting unit 800 performs, in the same manner as the depth map correcting unit 300 in FIG. 1, weighted smoothing on an interested pixel "E(X,Y)" and its peripheral pixels on the disparity map, thereby correcting the disparity map. A weight used at this time is set in accordance with a distribution of pixel values of a corresponding interested pixel "C (x,y)" in the input image corresponding to an interested pixel "E" and corresponding peripheral pixels (pixels in the input image corresponding to peripheral pixels). A weight is basically set based on a difference between pixel values of the corresponding interested pixel and the corresponding peripheral pixels. For example, as the difference becomes smaller, the weight may be set to be higher, and as the difference becomes larger, the weight may be set to be lower.

The correction of the disparity map may be performed by using, for example, a bilateral filter in the same manner as the first embodiment. In this case, assuming a corrected disparity value is "d' (X,Y)," the correction of the disparity map can be expressed by expression 6.

Expression 6: the disparity map correction using a bilateral filter $$d'(X, Y) = \frac{\sum_{n=-k}^{k} \sum_{m=-k}^{k} d(X+m, Y+n) * W(x, y, m, n)}{\sum_{n=-k}^{k} \sum_{m=-k}^{k} W(x, y, m, n)}$$

$$W(x, y, m, n) = W_1(m, n) * W_2(P(x, y), P(x+m, y+n))$$

where, "k" is a window size of the filter.

For example, if a Gaussian distribution is used for "$W_1$" and "$W_2$" in expression 6, the following expression is obtained:

$$W_1(m, n) = \frac{1}{\sqrt{2\pi\sigma_1}} \exp\left\{-\frac{m^2 + n^2}{2\sigma_1^2}\right\}$$

$$W_2(P(x, y), P(x+m, y+n)) =$$

$$\frac{1}{\sqrt{2\pi\sigma_2}} \exp\left\{-\frac{(P(x, y) - P(x+m, y+n))^2}{2\sigma_2^2}\right\}$$

Also, an ε filter, a weighted ε filter, a median value filter, or a weighted median value filter may be used. For a detailed description of a correcting method that uses each filter, see the first embodiment.

The three-dimensional image generating unit 400 will be described.

The three-dimensional image generating unit 400 generates parallax images from the disparity map obtained from the disparity map correcting unit 800 and the input image, in a parallax image generating unit 420 in the same manner as the first embodiment.

Thus, according to the present embodiment, a disparity map is generated by placing a disparity template according to an object detected from an input image and a disparity value of an interested pixel on the disparity map is corrected based on a weight with respect to peripheral pixels, the weight being determined on the basis of a distance between pixel values of a corresponding interested pixel and the corresponding peripheral pixels in the input image. Thereby, a disparity map adapted to actual three-dimensional information of an input image can be obtained with high contrast (for example, without an edge blurring), and therefore parallax images that enable a viewer to visually identify a high-quality three-dimensional image can be generated.

Fourth Embodiment

Figure 4:
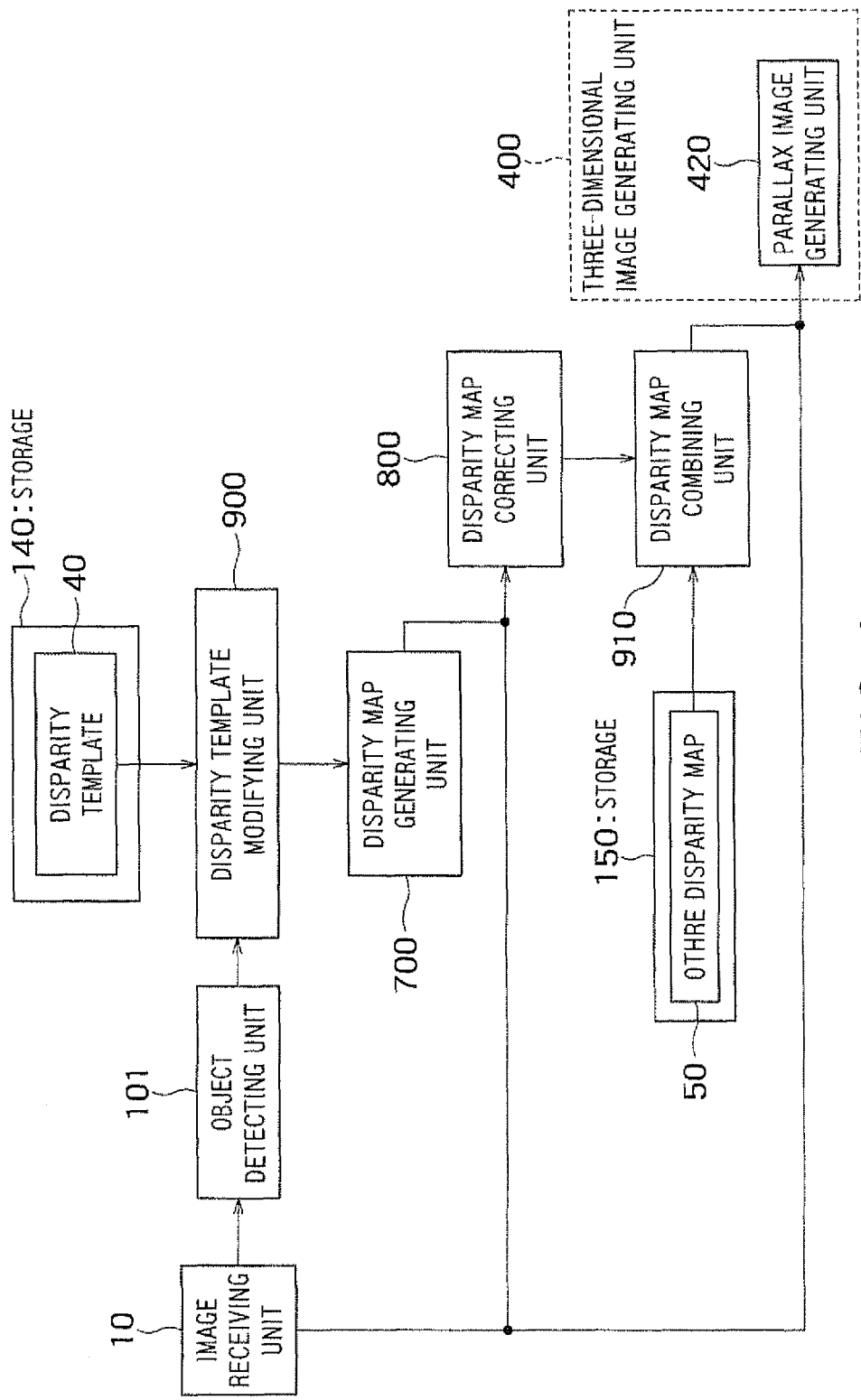
FIG. 4 illustrates a configuration example of an image processing apparatus according to a fourth embodiment.

FIG. 4 illustrates a configuration example of an image processing apparatus according to the present embodiment.

An image receiving unit 10 receives a two-dimensional image to be processed.

An object detecting unit 101 detects from the input image an object, a type, a position, a size, and an orientation of the object.

A storage 140 stores for each object type a disparity template 40.

A disparity template modifying unit 900 reads out from the storage 140 a disparity template 40 corresponding to a type of the object detected by the object detecting unit 101, and modifies the disparity template 40 based on the size and the orientation of the detected object.

A disparity map generating unit 700 generates a disparity map by placing on a map the disparity template modified by the disparity template modifying unit 900 on the basis of the position of the object detected by the object detecting unit 101 or on the basis of the position and the type of the object.

A disparity map correcting unit 800 performs weighted smoothing on the interested pixel and its peripheral pixels on the disparity map, thereby correcting the disparity map. Details of the processing are the same as the third embodiment.

A storage 150 stores another disparity map 50 that is given by some kind of means and corresponds to the input image.

A disparity map combining unit 910 combines the disparity map corrected by the disparity map correcting unit 800 and the other disparity map 50.

A three-dimensional image generating unit 400 generates parallax images from the input image and the corrected disparity map.

Now, the disparity template modifying unit 900, the disparity map generating unit 700, the other disparity map 50, the disparity map combining unit 910, and the three-dimensional image generating unit 400 will be described in more detail.

The disparity template modifying unit 900 will be described.

The disparity template modifying unit 900 modifies, in the same manner as the depth template modifying unit 500 in FIG. 2, the disparity template based on the size and the orientation of the detected object. A modifying method may be the same method used in the depth template modifying unit 500.

The disparity map generating unit 700 will be described.

The disparity map generating unit 700 places, in the same manner as the depth map generating unit 200 in FIG. 2, the disparity template modified by the disparity template modifying unit 900 on a position "Bi (X,Y)" on the disparity map corresponding to a position "Ai (x,y)" of the object detected by the object detecting unit 101.

The other disparity map 50 will be described.

The other disparity map 50 is a disparity map that is given by other means and relates to an input image. As the other disparity map 50, for example, background composition disparity from entire composition may be used. Furthermore, in processing for a moving image or the like, a disparity map used for an image t frames before may be used as the other disparity map.

The disparity map combining unit 910 will be described.

The disparity map combining unit 910 combines the disparity map corrected by the disparity map correcting unit 800 and the other disparity map 50. Any number of types of other disparity maps may be combined. In addition, a combining method may be the same method used in the depth map combining unit 600 in FIG. 2.

The three-dimensional image generating unit 400 will be described.

The three-dimensional image generating unit 400 generates, in a parallax image generating unit 420, parallax images from the disparity map generated by the disparity map combining unit 910 and the input image.

Thus, according to the fourth embodiment, even if a disparity map obtained by placing a disparity template is combined with another disparity map, a disparity map with high contrast can be obtained, and thereby parallax images that enable a viewer to visually identify a high-quality three-dimensional image can be generated.

The invention claimed is:

1. An image processing apparatus for a moving image having multiple frames, the image processing apparatus comprising:
a processing system configured to:
detect an object in an input two-dimensional image, corresponding to a current frame, including pixel values of each pixel and a size and an orientation of the object;
select, from at least one depth template defining a depth value of a pixel, a depth template corresponding to a type of the object, modify the selected depth template based on the size and orientation of the object, and place the modified depth template on a depth map in accordance with a position of the object to generate the depth map having a depth value for each pixel of the input image, wherein the processing system modifies the selected depth template by changing the depth value of the selected depth template based on a difference between an orientation of the selected depth template and the detected orientation of the object if the detected orientation of the object is different from the orientation of the selected depth template;
calculate a weight of at least one interested pixel and a weight of a peripheral pixel in the depth map based on a relationship between respective pixel values corresponding to the interested pixel and the peripheral pixel and provide a corrected depth map by correcting the depth value of the interested pixel in the depth map based on a weighted sum of respective depth values of the interested pixel and the peripheral pixel;
combine the corrected depth map and another depth map to provide a combined depth map, the other depth map being a depth map for an input two-dimensional image corresponding to a frame t frames before the current frame; and
generate a plurality of parallax images based on the combined depth map and the input two-dimensional image, wherein
the processing system is further configured to
determine a median value among pixel values corresponding to the interested pixel and peripheral pixels, assign a weight of 0 to a pixel associated with a pixel value that does not match a median value out of the peripheral pixels and the interested pixel, and
calculate an average of the depth value of a pixel associated with a pixel value that matches the median value out of the peripheral pixels and the interested pixel and correct the depth value of the interested pixel to the average.

2. The apparatus according to claim 1, wherein, when a plurality of depth templates overlap each other, the processing system uses an average of depth values of the depth templates.

3. The apparatus according to claim 1, wherein, when a plurality of depth templates overlap each other, the processing system uses a minimum value of depth values of the depth templates.

4. The apparatus according to claim 1, wherein, when a plurality of depth templates overlap each other, the processing system uses a weighted average of depth values of the depth templates.

5. The apparatus according to claim 1, wherein, when a plurality of depth templates overlap each other, the processing system uses a median value of depth values of the depth templates.

6. The apparatus according to claim 1, wherein object types are prioritized, and, when a plurality of depth templates overlap each other, the processing system uses a depth value of one of the depth templates which corresponds to a highest-priority object.

7. The apparatus according to claim 1, wherein the processing system changes the depth value of the selected depth template by means of a morphing technique based on the difference between an orientation of the selected depth template and the orientation of the object.

* * * * *